UNITED STATES PATENT OFFICE.

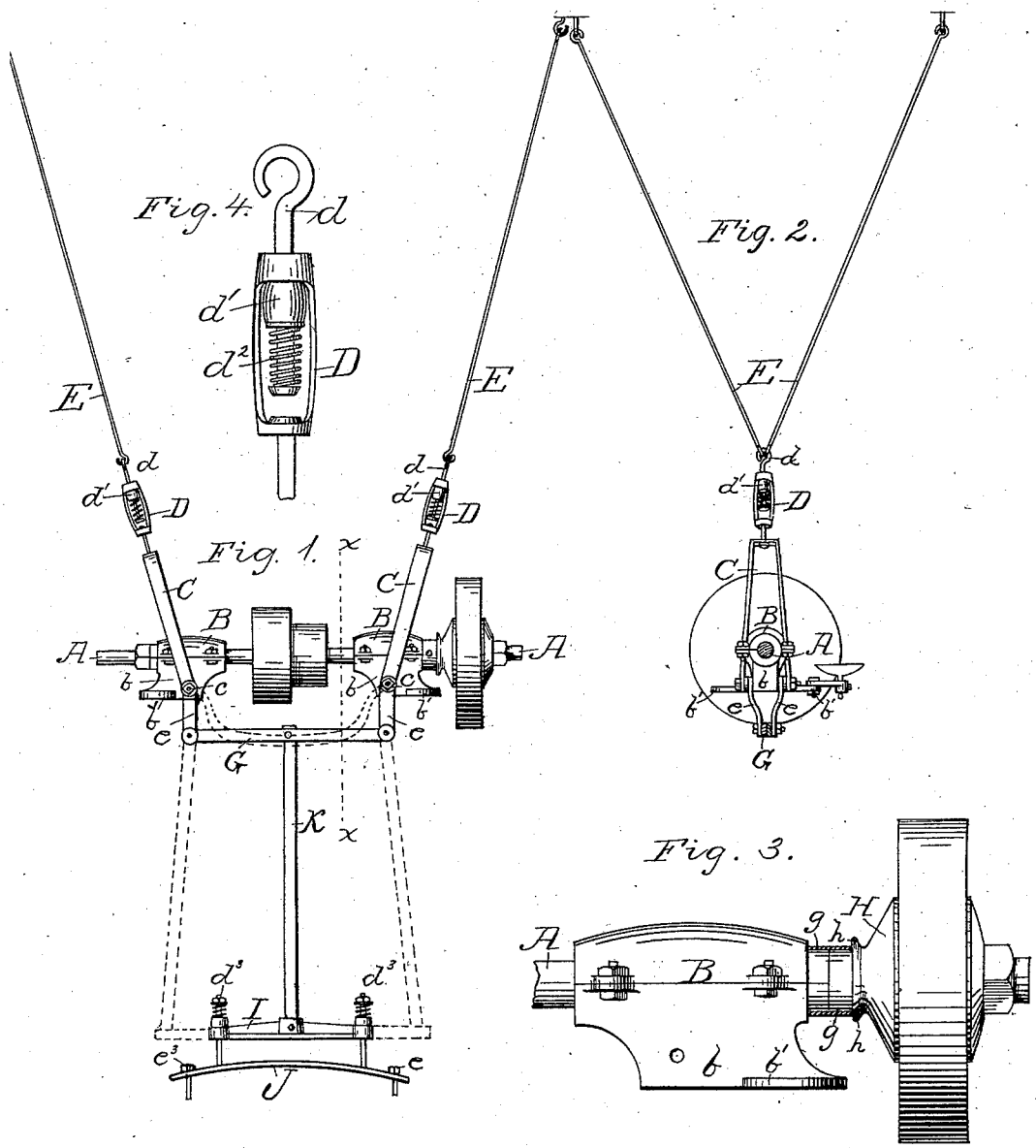

JOSEPH D. HUNTINGTON, OF CHICAGO, ILLINOIS.

DEVICE FOR SUSPENDING MACHINERY.

SPECIFICATION forming part of Letters Patent No. 307,115, dated October 28, 1884.

Application filed August 22, 1884. (No model.)

*To all whom it may concern:*

Be it known that I, JOSEPH D. HUNTINGTON, of Chicago, in the county of Cook and State of Illinois, have invented certain new and useful Improvements in Devices for Suspending Machinery; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object the keeping of the journal-boxes of suspended machine-frames (similar to those described in my Letters Patent Nos. 290,056 and 297,133) always bearing outward against the rotating devices, so that the wear occasioned by the friction between the bearing-boxes and the collar or arbor of the rotating devices which it is desired to center may be automatically taken up and the longitudinal or end vibration thus be avoided.

In the drawings, Figure 1 is a side elevation of my improved machine. Fig. 2 is a vertical transverse section taken on line $x\,x$, Fig. 1; and Figs. 3 and 4 are detail views.

The same principle expressed in my previous Letters Patent Nos. 290,056 and 297,133, concerning the suspension of the frames and the automatic finding of the centers of the rotating bodies thereon, applies with equal force to the subject-matter of this present application; but in the aforesaid Letters Patent it will be observed that the journal boxes or bearings were connected, while in this invention (the subject-matter of the present application) they are entirely disconnected, in order that, as will hereinafter be more fully explained, any wear occasioned by the friction of the contiguous surfaces of the journal-boxes and collar or arbor of the rotating body may be taken up, and, by being constantly in contact therewith, prevent end or longitudinal vibration.

In the drawings, A represents the shaft journaled in the independent bearing-boxes B B, each of which is composed of a pillow-block and a cap secured together by bolts and nuts in the usual manner. Depending from the pillow-blocks of these bearing-boxes B are the extensions $b$, from which latter, extending laterally to either side, are lugs $b'$, to which arms supporting the tool-rest may be connected, as shown in the drawings.

On the shaft A, between the bearings B, is the speed-pulley, and on either end of said shaft, extending beyond said bearings, may be placed an emery, polishing, or other wheel to which it may be desirable to center a suitable collar.

The bearings B are entirely independent of each other and are suspended between the ends of the inverted-U frame or yoke C by means of a suitable bolt, $c$, passing through the extension $b$ of the pillow-blocks of the bearings B.

Passing downward through that part of the yoke C connecting the arms thereof is a short rod, which is connected at its upper end to the spring turn-buckle D, and extending from the upper end of the turn-buckle is a hook, $d$, to which are connected the suspension rods or wires E, the upper ends of which are secured in suitable eyes or brackets depending from the ceiling or rafters.

The noticeable feature of the turn-buckle D is that the tang of the hook $d$ extends down through the upper end thereof, then through a rubber cushion, $d'$, and then passes through a coil expansion-spring, $d^2$, and is provided with an enlarged head to prevent its withdrawal. The advantage of this form of turn-buckle is that the rubber cushion $d'$ serves as a sort of packing, insulating the tang of the hook $d$ from the metal of the turn-buckle, and the coil-spring assimilates the vibrations imparted by the rapidly-revolving devices of the suspended machine.

Secured to the extension $b$ of the bearings B, preferably by the same bolts and nuts securing the arms of yoke C thereto, are the links $e$, which extend downward and have secured between their lower extremities, by bolts and nuts, the horizontal and longitudinal cross bar or bars G, which connect the said links, and thus indirectly connect the bearings. The cross bar or bars G may be flexible or rigid, as desired. At about the centers of length they are connected, by means of a vertical rod, K, to the devices for connecting the machine to the floor—namely, those mentioned and claimed in my Letters Patent numbered 297,133, and consisting of the "spring-plate I, floor-plate J, bolts $d$ and $e$, and springs," with this exception, that I employ the same combination of rubber cushions and steel springs with said bolts $d$ and $e$ as are employed in the turn-buckles D, instead of simply the rubber spring used with the old spring-plate.

As stated, the principle object of my invention is to avoid end-play of the shaft. To accomplish this I incline the suspension rods or wires out toward the contiguous end of the shaft. In this manner there is a continual tendency of the bearing-boxes to bear against the collar near the ends of the shaft and contiguous to the emery, polishing, or other wheel. Thus the bearing-boxes bearing outward in opposite directions prevent any end or longitudinal play of the shaft.

In order that the dust generated by the emery or polishing wheel may not get between the engaging-surfaces of the bearing-boxes, and the collar or arbor cause an abnormal wearing of those surfaces, I step the outer end of the bearing-boxes, as shown, and provide the collar H of the said wheels with a boss corresponding in diameter to said stepped portion of the bearing-boxes, and then place around them a guard-band, $g$, which preferably is secured to the boss of the collar H. Another feature of this collar H, which is necessary in view of the engagement of the contiguous surfaces of the bearing-boxes and the collar next the wheels (if there be any) on the ends of the shaft A, is the circumferential bead $h$, which is placed next the boss. The centrifugal force of this bead as the collar revolves throws off the oil, which oozes out to the crest thereof, and prevents it from getting on the wheel, which, if it be of emery, buff, felt, or other material for grinding and polishing purposes, is greatly injured thereby.

It may sometimes be desirable to place the drive-pulley on the outer end of the shaft A and the wheel which it is desired to center between the bearings. In this case the cross-bar may be changed, as shown in dotted lines in Fig. 1, the ends being secured direct to the bolts securing the arms of the yoke C direct to the extensions $b$, thus dispensing with the links.

I do not wish to be confined to the use of one vertical rod, K, for the cross-bars G may, if desired, be connected to the spring-plate by more than one. Moreover, if desired, the vertical rods may be connected direct to the bearing, and as they extend downward separate from each other, similar to the suspension-rods.

In arranging the rubber and coil springs in the turn-buckle and on the bolts $d$ and $e$ their position may, if desired, be reversed from the order in which I have described them.

What I claim as new, and desire to secure by Letters Patent, is—

1. The combination of the shaft A, the bearing-boxes, independent of each other, in which said shaft is journaled, and the means for suspending the same between the ceiling and floor, as and for the purpose set forth.

2. The combination of the shaft, the bearing-boxes in which said shaft is journaled, the yokes and suspension-rods by means of which said bearings are suspended, which incline outward toward the contiguous ends of said shaft, and the means, substantially as set forth, for connecting said bearings to the floor.

3. The combination, with the shaft and the bearing-boxes, of the yokes, the spring turn-buckles and suspension-rods, and the devices for connecting said bearing-boxes to the floor.

4. The combination, with the shaft and the bearing-boxes in which said shaft is journaled, of the yoke, turn-buckles having therein a rubber cushion, and a coil expansion-spring, the suspension-rods, and the devices for securing said bearings to the floor.

5. The combination, with the shaft, bearing-boxes independent of each other, and means for suspending the same, of the vertical rod or rods, and means for securing the same to the floor, substantially as and for the purpose set forth.

6. The combination, with the shaft, bearing-boxes independent of each other, and means for suspending the same, of one or more cross-bars, the vertical rod or rods, and means for connecting the same to the floor.

7. The combination, with the shaft, bearing-boxes independent of each other, and means for suspending the same, of the links, cross-bars, one or more vertical rods, and the devices for connecting the same to the floor.

8. The combination, with the shaft, the independent bearing-boxes, and the collar or arbor of the rotating devices, of the guard-band, preferably secured to the same and surrounding and protecting from dust and dirt the engaging-surfaces of said bearing-boxes and collar.

9. The combination, with the shaft and the independent bearing-boxes, of the collar having a circumferential bead contiguous to the engaging-surfaces of the said collar and bearing-boxes, substantially as hereinbefore set forth.

In testimony that I claim the foregoing as my own I hereunto affix my signature in presence of two witnesses.

JOSEPH D. HUNTINGTON.

Witnesses:
JAMES H. COYNE,
FRANK D. THOMASON.